Oct. 27, 1970     J. BERNAIX     3,535,920
METHOD AND DEVICE FOR EXTENSOMETRIC MEASUREMENT
Filed Feb. 13, 1968     3 Sheets-Sheet 1
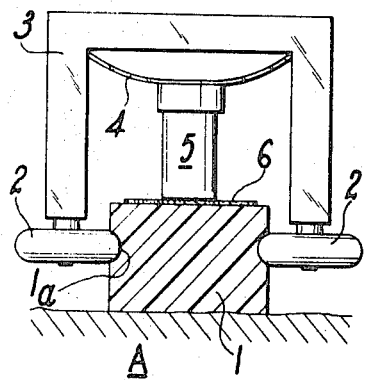
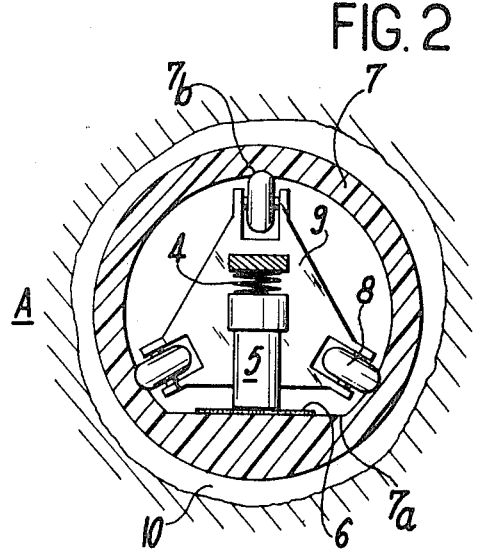
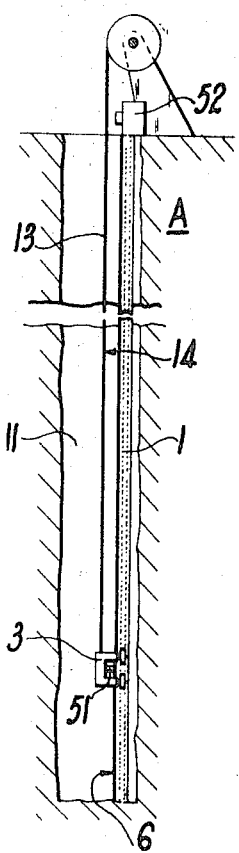
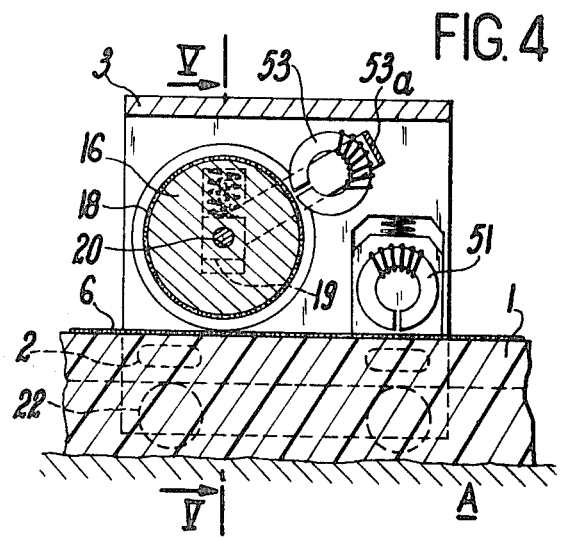

Oct. 27, 1970  J. BERNAIX  3,535,920
METHOD AND DEVICE FOR EXTENSOMETRIC MEASUREMENT
Filed Feb. 13, 1968  3 Sheets-Sheet 2

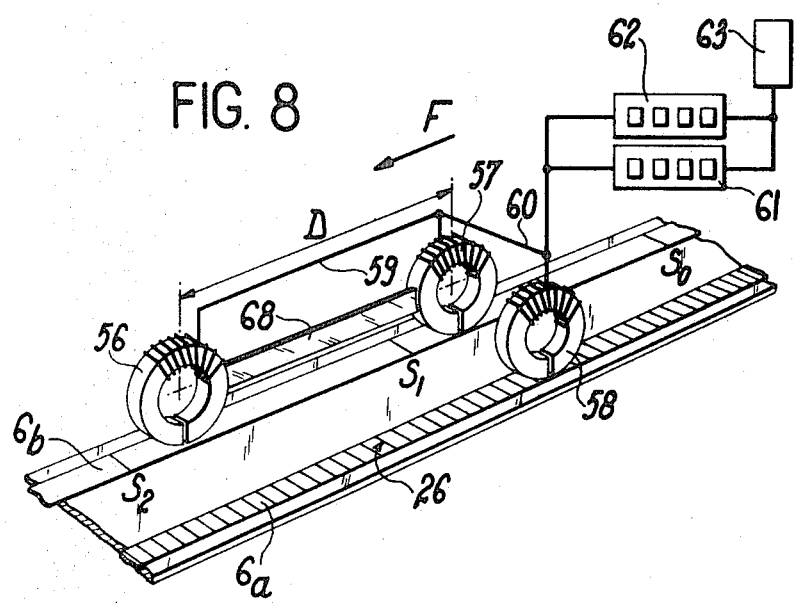

United States Patent Office 3,535,920
Patented Oct. 27, 1970

3,535,920
METHOD AND DEVICE FOR EXTENSOMETRIC MEASUREMENT
Jean Bernaix, Saint-Mande, France, assignor to Commissariat a l'Energie Atomique and Societe Anonyme Coyne et Bellier, both of Paris, France
Filed Feb. 13, 1968, Ser. No. 705,070
Claims priority, application France, Feb. 17, 1967, 95,426
Int. Cl. G01b 7/16; G01n 3/00
U.S. Cl. 73—88.5          21 Claims

ABSTRACT OF THE DISCLOSURE

A method of extensometric measurement whereby deformations of a solid can be measured along any line of the wall of said solid, said method being characterized in that it consists in securely attaching to the wall of the solid in its undeformed state a magnetic tape carrying a signal which is distributed along said tape and then, at the time of deformation of the solid, in reading along said magnetic tape the modified signal resulting from the deformation of the magnetic tape which has accompanied the deformation of the solid by comparing said signal with a reference signal.

---

This invention is directed to a method of extensometric measurement on the wall of a solid and a device for the application of said method.

A number of different methods and devices for extensometric measurement of this type are already known. As a rule, they permit the possibility either of measuring a small area of the wall of the solid or of measuring a variation in distance between two points of said wall.

The present invention is concerned with a method of extensometric measurement whereby deformations of a solid can be measured along any line of the wall of said solid, said method being essentially characterized in that it consists in securely attaching to the wall of the solid in its undeformed state and along a line of said wall a magnetic tape carrying a signal which is distributed along said tape and then, at the time of deformation of the solid, in reading along said tape the modified signal resulting from the deformation of the tape which has accompanied the deformation of the solid by comparing said signal with a reference signal.

In the majority of applications, the initial signal carried by the magnetic tape is periodic and uniformly distributed along said tape.

The invention is also concerned with an extensometrc measurng device for the practical application of said method, said device being essentially characterized in that it comprises at least one magnetic tape which is securely attached to the wall of the solid to be studied and which is provided with at least one track, at least two magnetic heads of which at least one is a reading head, and a magnetic-head carriage which is guided in a direction parallel to said tape.

The tape can be bonded directly to the solid when the surface of the latter is of uniform shape and when the magnetic-head carriage can be guided by a frame located externally of the solid to be tested as is the case with a laboratory test-piece. When the solid is of either complex or irregular shape, the tape can be carried by a deformable rail which serves to guide the magnetic-head carriage and which is rigidly fixed to the surface of the solid; the method of fixing adopted depends on the particular case under consideration and can in particular be a bonding process.

The guide rail can especialy be of tubular shape, in which case the magnetic tape is carried on the internal wall of the rail whilst the carriage is permitted to travel within the interior of said rail.

The periodic signal can be pre-recorded on the magnetic tape. After attachment of the tape, said signal can also be transferred thereto by means of a reference tape which will subsequently serve as a term of comparison for the study of the modified periodic signal.

The signal can also have a sufficiently long period on the tape to ensure that two simultaneous direct readings of the same tape taken by means of two magnetic heads which are spaced at a distance exactly corresponding to said signal period should accordingly give the deformation of the periodic signal without a comparison signal. The standard adopted as a reference is in that case the spacing of the reading heads on the supporting carriage.

In another embodiment of the invention, the tape is provided with two tracks, one of which bears the measurement signal in the form of a recurrent train of closely spaced pulses or bits whilst pulses which are spaced at a constant distance which constitutes the reference are transferred on the second track at each measurement.

Preferably, this result is obtained by recording an origin pulse on said second track and by making use of a carriage with two interconected magnetic heads, the first as considered in the direction of progression of the heads along the tape being a recording head whilst the other is a reading head, the distance between said heads being the constant reference distance.

Thus, when the reading head receives the origin pulse during its displacement, the recording head transfers said pulse forward on the second track in the direction of forward travel and said pulse will be read in its turn when the magnetic-head carriage has finally travelled over the reference distance.

The counting of the pulses of the first track within the interval between signals produced by the reading of pulses of the second track can thus give directly a measurement of the deformation of the wall of the solid.

The two-track method referred-to above can be employed if the arrangements of the pulses (or bits) on the track after bonding is sufficiently uniform to consider that the initial state prior to deformation of the support is identical along the entire length of the magnetic tape.

On the other hand, if the arrangement of pulses is irregular, it is essential to store the memory of their distribution after bonding and prior to deformation of the magnetic tape. It is possible to adopt a method entailing the use of two tracks, one of which bears pulses which change polarity periodically or alternatively a method entailing the use of three tracks.

Other properties and advantages of the present invention will become readily apparent from the following description, reference being had to the accompanying drawings which are given solely by way of example and not in any limiting sense, and in which:

FIG. 1 is a transverse sectional view of a rail which is designed to carry a magnetic tape and a carriage equipped with reading or recording heads which are adapted to cooperate with said tape;

FIG. 2 is a transverse sectional view of a similar arrangement of tubular shape which is suitable for boreholes;

FIG. 3 is a diagrammatic representation of a device which is suitable for use in a substantially rectilinear borehole;

FIG. 4 is a sectional view taken along the line IV—IV of a magnetic-head carriage and of its support rail, in which a reference signal support is carried by the carriage itself;

FIG. 8 is a diagrammatic view in perspective of a device in which two tracks are employed;

FIGS. 9a and 9b illustrate diagrammatcally the distribution of pulses on the tracks for a device in which either two or three tracks can be employed.

Figure 5:
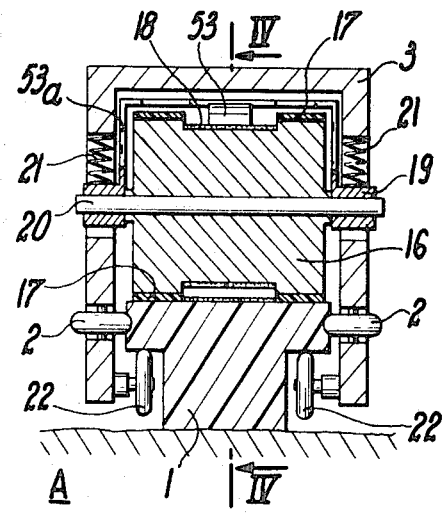
FIG. 5 is a sectional view along the line V—V of FIG. 4.

In FIG. 1, there is shown a rail 1 which is fixed in contact with the solid A for the purpose of studying the deformations of said solid in the direction at right angles to the cross-section. Said rail is formed of a material which affords a sufficient degree of flexibility to follow the deformations of the solid A without interfering with such deformations while being nevertheless sufficiently rigid to permit the guided displacement of the carriage 3 by means of the rolling motion of the runner-wheels 2 in the longitudinal grooves 1a of said rail. Some semi-rigid plastics such as the superpolyamides are suitable for this purpose.

The carriage 3 is adapted to carry by means of the blade spring 4 a magnetic head 5 and this latter is thus applied elastically in contact with the magnetic tape 6 which is bonded to the top face of the rail 1.

The carriage 3 can be self-driven, for example by means of a motor which is adapted to drive at least one of its runner-wheels 2. The carriage can also be drawn by a cable in virtually uniform motion. As will become apparent later, the carriage can even be displaced manually in certain cases.

When testing of deformations of the solid has to be carried out internally within a borehole formed within the solid, the rail 1 can be replaced (as shown in FIG. 2) by a tube 7 which is obtained by extrusion and in which is formed a flat internal longitudinal face to which the magnetic tape 6 is bonded. The runner-wheels 8 of the carriage 9 which are three in number and disposed, for example, in star formation, are adapted to run in grooves 7b which are formed in the internal wall of the tube 7.

The runner-wheels 8 may be mounted on springs if so required and the shape and position of the grooves 7b are adapted to tolerate a substantial deformation of the tube 7 while ensuring the application of the magnetic head or heads 5 against the magnetic tape 6.

As in the previous embodiment, said carriage is adapted to carry either one or a number of magnetic heads 5 which are applied elastically against the magnetic tape 6 by means of a spring 4.

In the particular case shown in FIG. 2, the solid A is the ground and the tube 7 is attached to a borehole by means of mortar 10 or by means of a polymerizable adhesive of the epoxy type, for example, which is injected into the free space surrounding said tube.

FIG. 3 illustrates a first example of application of the invention in which a reference signal is carried by a material support and in which a mechanical connection serves to associate the rate of displacement of the head for reading the signal recorded on the tape which is subjected to deformation with the rate of reading of the reference signal.

The rail 1 which carries the magnetic tape 6 is fixed against the wall of the borehole 11. The carriage 3 which is fitted with the reading head 51 is drawn by a flexible band 13 of constant length fabricated, for example, from the metal known as Invar. A magnetic tape 14 which carries the reference signal is bonded to said band. The composite strip 13–14 can be maintained in tension under gravity (as in the case of FIG. 3) or by means of a cable and guide pulley when the borehole 11 is not vertical.

The magnetic tape 14 is intended to progress in front of a stationary magnetic head 52. Said magnetic tape can be provided in advance with a reference signal, for example in the form of a constant frequency, that is to say a constant number of cycles per unit length of tape. A reference signal of this type can also be transferred to the magnetic tape 14 by means of the head 52 at the requisite moment.

Prior to any deformation of the solid A which carries the rail 1, the signal is transferred to the magnetic tape 6 which is carried by said rail. To this end, the head 52 reads the signal which is already carried by the magnetic tape 14 and transfers said signal to the head 51 for the purpose of transferring it to the tape 6.

When the solid A is deformed, the signals carried by the magnetic tapes 6 and 14 are read simultaneously by means of the heads 51 and 52. In order to facilitate the analysis of the information, the readings obtained can be transferred to a magnetic tape having two tracks by means of a suitable tape recorder. There are thus juxtaposed on each element of said tape the reference signal (N cycles per centimeter) and the deformed signal ($N_1$ cycles per centimeter.)

The analysis of the recording is caried out either by studying the pulsations if the reference wavelength is long (of the order of one centimeter) or by counting said pulsations by means of a pulse counter if said wavelength is short. It is thus possible as a result of said analysis to measure the deformation of the solid at practically all points of the length under study.

When the path followed by the rail 1 is not rectilinear as is the case, for example, when said rail is attached to a skew surface (aircraft wing, barrage arch, non-rectilinear borehole, concrete shell of complex shape), the device shown in FIGS. 4 and 5 can accordingly be employed.

In addition to the reading head 51 of the magnetic tape 6, the carriage 3 also carries a drum 16 which is provided on each side of the magnetic tape 6 with two flanges 17 which are applied in rolling contact with the rail 1. Said flanges are formed of a material which has a very high coefficient of friction such as neoprene, for example, and may be knurled if necessary. The magnetic tape 18 is wound around and bonded to the periphery of the drum 16 between the two flanges of this latter. Said magnetic tape 18 carries the reference signal which is read by the magnetic head 53. The bearings 19 which carry the shaft 20 of the drum 16 and which are joined together by means of the rigid yoke 53a which supports the head 53 are subjected to the thrust exerted by the springs 21 which are applied against the carriage 3. The reaction of said thrust is carried by the runner-wheels 22 which bear on the edges of the rail. Any slippage of the drum with respect to the rail 1 is thereby prevented.

The reference signal can also be supplied by means of an optical coder which is placed on the end of the shaft of the drum 16 (coders of the type which are at present manufactured have a diameter of 1.5 cm. and produce 10,000 equidistant pulses per revolution).

The reference signal which is read by the magnetic head 53 or which is supplied by an optical coder is transferred to the magnetic tape 6 prior to deformation of the solid A. After deformation, the heads 51 and 53 which are both reading heads supply in one case the reference signal and in the other case the deformed signal, said signals being analyzed as in the case of FIG. 3.

It will be noted that, in the case of FIG. 3 as in the case of FIGS. 4 and 5, the results obtained are independent of the speed of displacement of the carriages over a very wide range of values, thereby facilitating the application of motion to said carriages as well as permitting the manual displacement of these latter if necessary, for example along a rail 1 which follows a tortuous path.

Figure 6:
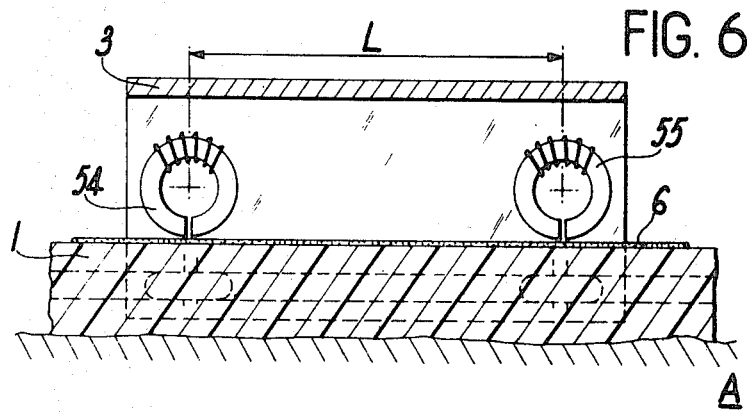
FIG. 6 is a diagram of a carriage which permits differential comparison of the signals carried by a single magnetic-tape track.

In the embodiment which is illustrated in FIG. 6, the carriage 3 which is adapted to move along the rail 1 carries two reading heads 54 and 55 which are spaced at a distance L such as, for example, five centimeters. This distance is maintained constant by fabricating the carriage 3 or the support of the heads 54 and 55 from a very rigid material which has a negligible coefficient of expansion.

A signal 24 which is amplitude-modulated with precisely said length L as the selected wavelength is prerecorded on the magnetic tape 6. The envelope curve 25 of the amplitude of the signal is a saw-tooth curve having rectilineal sides which have an equal angle of inclination.

The magnetic tape is maintained rectilinear and attacted to the solid to be studied. Consequently, when the carriage 3 is displaced opposite to said magnetic tape at constant speed and prior to any deformation of said solid, the signals read by the magnetic heads 54 and 55 are equal at each instant. On the other hand, after the solid has undergone deformation which brings the envelope 25 and 25a, the two signals which are read at each instant are no longer identical. As in the previous case, said signals can be recorded for the purpose of comparison with a double-track tape recorder, and if the envelope curve 25 does in fact have a saw-tooth waveform with equal slopes, the difference between the signals read by the two magnetic heads is proportional to the variation in length of the magnetic tape whilst the sign of the difference indicates either lengthening or shortening.

When the sides of the curve 25 are not rectilinear, a correction of the results is essential. A correction is also mandatory if the attachment of the magnetic tape 6 to the solid has produced beforehand a distortion of the prerecorded signal on said tape. It then proves necessary to take comparative measurements between the initial state of the tape immediately prior to attachment to the solid and prior to deformation of this latter and the state of the tape after deformation of said solid.

Another cause of error can arise from a nonuniform displacement of the carriage 3 which results in variations in the read signals. In fact, if $\Phi$ designates the value of the magnetic flux, the instantaneous value of the read signal is equal to $dt/d\Phi$; if the reading rate varies about a mean value, there will appear a distortion which is proportional to the variation in rate and to the slope of the sides of the envelope 25.

Figure 7A:
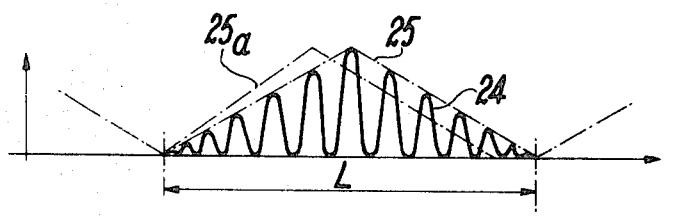
FIGS. 7a and 7b are graphic illustrations of the signals which are carried by the track which is employed in the case of FIG. 6.
Figure 7B:
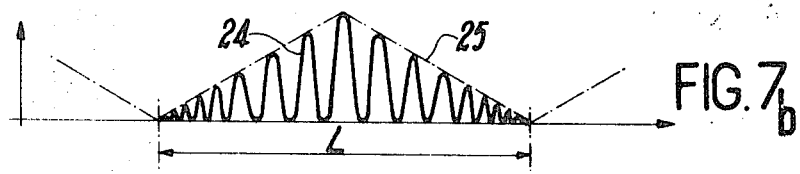

In order to overcome this drawback, as is shown diagrammatically in FIG. 7b, the signal 24 is modulated both in amplitude and in frequency; and the slope of the frequency modulation, that is to say the variation in frequency per unit length is the same as the slope of the amplitude modulation but opposite to this latter. Thus, a variation in speed of the carriage relative to the mean speed results in variations in opposite directions of the instantaneous value of the signal which are due respectively to the amplitude modulation and to the frequency modulation. The comparison of the signals read by the heads 54 and 55 then becomes independent of the reading rate.

It is thus possible to make use of Hall effect reading heads. These heads supply a signal which is proportional to the magnetic field (and not to the variation of field) and make it possibe to take the measurement independently of the reading rate.

In the embodiment shown in FIG. 8, the magnetic tape 6 is provided with two tracks 6A and 6B. The track 6A carries a signal of very short wavelength, that is to say in effect a train of equidistant unitary pulses (as represented diagrammatically by the lines 26) corresponding to the limit of resolution of the usual magnetic heads, namely approximately two microns in the case of a normal reading rate.

Initially, the track 6B is unrecorded.

In this case, the carriage 3 is provided with three magnetic heads.

The head 58 reads the signal which is recorded on the track 6A, the two other heads (56 and 57) are located opposite to the unrecorded track 6B. These two heads (56 and 57) are maintained at a distance D with respect to each other which is fixed and well-determined, for example by means of a support plate 68 of Invar metal. This distance constitutes a length standard which makes it possible to measure at any given point a variation in length of the magnetic tape 6. The magnetic head 57 is a reading head whilst the head 56 is a recording head.

The carriage being placed at one end of the magnetic tape, an origin signal $S_0$ is printed on the track 6B by any suitable means.

When the head 57 reads the signal $S_0$ as the carriage moves in the direction of the arrow F, a signal $S_1$ is accordingly recorded by the head 56 at a distance D in front on the track 6B by virtue of the electrical connection 59 and the counter 61 initiates a count by means of the connection 60.

When the signal $S_1$ is reached by the head 57, a further signal $S_2$ is printed on the track 6B. The total of the counter 61 is transmitted to the printing apparatus 63 (which is known per se); the counter 61 is reset to zero and the counter 62 begins a further counting operation; the counters 61 and 62 thus come into operation in alternate sequence and transmit their results to the apparatus 63.

Thus, by reading the number of pulses contained in the successive tape lengths D, it is possible to follow the variations of these lengths and therefore of the solid to which said magnetic tape is attached.

Prior to each measurement, the carriage travels along the magnetic tape and one of the magnetic heads such as the head 57, for example, erases the signal $S_1$, $S_2$ . . . which were recorded during the previous measurement and possibly in such a manner as to retain only the origin signal $S_0$.

In the embodiment shown in FIGS. 9a and 9b, provision is made for two tracks 6a and 6b and two magnetic heads 64 and 65 spaced at a distance of one centimeter, for example (standard distance). The track 6b is unrecorded. The track 6a bears a series of positive and negative pulses or bits over successive lengths of approximately one centimeter (5,000 bits of each sign, for example).

When the head 54 reaches point A, the change of sign of the pulses or bits triggers the impression of a pulse by the head 65 at B at the standard distance of one centimeter.

In FIG. 9b, the reference numeral 66 represents a flip-flop which is blocked in one direction by the signal which is delivered by the magnetic head 64; if this signal changes sign, the flip-flop 66 triggers at 67 the delivery of a pulse (bit) at B to the magnetic head 65, then remains blocked in the other direction.

The variations in the number of pulses either between A and B or between B and C produce variations in length. Taking into account the fact that an error (of very small value) can be caused by spurious signals, it is preferable to count between B and C.

Should any difficulty be experienced in discriminating between positive and negative signals, it is possible to add a third track (6c) which bears either separate pulses or alternate series of saturated passages and blank passages which will permit the same location at A, C, etc. In the case of all the above-mentioned embodiments comprising either one, two or three tracks, the magnetic heads employed are preferably of the so-called "high-fidelity" type and comprise an air-gap of the smallest possible width such as, for example, 2 microns.

Even when the measurements are taken in order to avoid the disadvantages attached to variations in speed of the magnetic-head carriage, these variations must be maintained within fairly narrow limits and be slow variations in order to prevent distortions of the signal and to maintain this latter within a predetermined band of frequencies.

It is also possible to make use of Hall effect reading heads. Signals recorded on the tape can then be read independently of the speed at which the carriage passes and in particular at a very low rate, thereby facilitating the problems of guidance (absence of shocks and vibrations).

A magnetic tape which is kept in a damp location or even underwater can be covered with a protective film having a silicone base. It is also possible to make use of magnetic tapes known commercially as "Mylar" tapes. In all cases, the magnetic heads employed are preferably of leak-tight design.

In order to prevent any errors which might arise between two measurements as a result of accumulation of dust particles or other foreign substances on the magnetic tape, the carriage can be equipped with a cleaning system with brushes which precedes the magnetic heads in the direction of forward travel.

Finally, in order to prevent reading errors which could arise from wobbling of the carriage during its travel along the guide rail, two magnetic tapes 6 can be placed as near as possible to the edges of the rail 1, the mean value of the readings of the two magnetic tapes being accordingly taken for the measurements.

By means of the methods and devices which has just been described, the deformations of a solid can either be measured continuously over the entire length of the test path or non-continuously by means of the last method hereinabove described but with very short intervals.

The deformation of any object can be tested along any line which is marked out along its wall provided that the changes of curvature or of direction along the line thus marked out are compatible with the attachment of a tape-carrying rail and with the motion of the magnetic-head carriage along said rail.

There is no limitation in regard to the maximum size of the object to be tested, the minimum size being of the order of one centimeter.

Absolution precision of the measurements taken depends on the minimum length of recording of a pulse on a magnetic tape. As has already been pointed out, this length can be assessed at a value of two microns.

The invention is not only applicable to the observation of continuous deformations of a solid but also to the location both in position and in width of any discontinuities such as cracks which may appear and develop in said solid. There may result a substantial and highly localized deformation either of the rail or of the tape and even final rupture, but this does not carry any disadvantage as long as such a rupture does not disturb the displacement of the carriage.

What we claim is:

1. A method of extensometric measurement whereby strains undergone by solid can be measured along any line of a wall of said solid, the steps of securely attaching to said wall of said solid in its undeformed state and along a line of said wall a tape carrying a periodic signal uniformly distributed along said tape, then, at the time of deformation of said solid, measuring the variation of amplitude with distance of each cycle on the deformed tape and comparing said variation with the variation of a known reference signal, the resulting difference providing an indication of the strain deformation.

2. A method extensometric measurement whereby strains undergone by a solid can be measured along any line of a wall of said solid, the steps of securely attaching to said wall of said solid in its undeformed state and along a line of said wall a tape carrying a periodic signal uniformly distributed along said tape, then, at the time of deformation of said solid, measuring the number of cycles per unit length on the deformed tape and comparing that number with a predetermined reference number, the resulting difference providing an indication of the strain deformation.

3. A method of extensometric measurement whereby strains undergone by a solid can be measured along any line of a wall of said solid, the steps of securely attaching to said wall of said solid in its undeformed state and along a line of said wall a tape carrying a periodic signal uniformly distributed along said tape, then, at the time of deformation of said solid measuring the amplitude of the signal at each point along the tape and comparing that amplitude with the measured amplitude of the signal at a predetermined fixed distance, the resulting difference providing an indication of the strain deformation.

4. An extensometric measuring device for measuring the strain deformation of a solid comprising a magnetic tape bearing a signal having a periodic variation of amplitude with distance and securely attached to a wall of said solid so as to deform with said wall, a movable carriage, adapted to move along the surface of said solid and bearing means to measure the variation of the amplitude of said signal with distance along said tape and means to compare said measured amplitude with the amplitude of the signal at a predetermined fixed distance from the point of measurement, the difference between said measured amplitudes providing an indication of the strain deformation of said solid.

5. An extensometric measuring device for measuring strain deformation of a solid comprising a magnetic tape bearing a signal having a periodic variation of amplitude with distance and securely attached to a wall of said solid so as to deform with said wall, a movable carriage, adapted to move along the surface of said solid and bearing means to measure the variation of the amplitude of said signal with distance along the tape and means to compare a characteristic of said measured signal within a predetermined unitary portion of said tape with the characteristic of a known reference signal, the difference between the signal of the deformed tape and reference signal providing an indication of the strain deformation of said solid.

6. An extensometric measuring, device in accordance with claim 5, the magnetic tapes being bonded directly to the wall of the solid to be studied and said head carriage being guided by a frame located externally of said solid.

7. A device in accordance with claim 5, said magnetic tapes being attached to the solid by means of rails for displacement of said head carriages.

8. A device in accordance with claim 7, characterized in that the rails are tubular and that the carriages are adapted to travel inside said rails.

9. A device in accordance with claim 5 one of said heads reading a reference signal and the other of said heads reading a similar signal indicating deformation of the solid.

10. A device in accordance with claim 9, said reference signal being carried by a second magnetic tape of unvarying length and parallel to said magnetic tape attached to the solid, both magnetic tapes being read simultaneously.

11. A device in accordance with claim 10, said reference signal being carried by a second magnetic tape of length establishing the origin of the signal on said magnetic tape attached to the solid.

12. A device in accordance with claim 5, said carriage carrying a drum rotating without slippage along said magnetic tape and carrying two magnetic heads one of said heads reading said magnetic tape.

13. A device in accordance with claim 12, the second of said heads reading a magnetic reference signal tape secured at the periphery of said drum.

14. A device in accordance with claim 12, including a shaft for said drum, said reference signal being supplied by an optical coder at the end of said shaft.

15. A device in accordance with claim 5, said magnetic tape providing a signal modulated at least in amplitude in a saw-tooth wave envelope, said carriage having two reading heads spaced at a distance exactly corresponding to the wavelength of the envelope and reading simultaneously the signal from said magnetic tape.

16. A device in accordance with claim 15, said signal being equal and of opposite direction with respect to the slope of the saw-tooth curve of the amplitude modulation.

17. A device in accordance with claim 5, said magnetic tape carrying two parallel tracks, one track providing a recurrent train of closely-spaced pulses the other track providing signals spaced at a constant reference distance at the time of a measurement, the pulses of the recurrent train being counted within the interval between two consecutive signals of the second track.

18. A device in accordance with claim 17, the constant-distance transfer of signals on the second track being obtained by a printing head and a reading head and means for setting said heads in the direction of progression of the magnetic heads at said constant distance from each other by an origin signal read by the second head and delivered to the first head.

19. A device in accordance with claim 5, said magnetic tape having two tracks, one of said tracks providing pulses which periodically change polarity.

20. A device in accordance with claim 5, said magnetic tape having three tracks.

21. A device in accordance with claim 5, said reading heads being Hall effect heads.

References Cited

UNITED STATES PATENTS

| | | | |
|---|---|---|---|
| 2,485,285 | 10/1949 | Harris | 175—183 |
| 2,655,633 | 10/1953 | Minor | 324—34 |
| 2,989,690 | 6/1961 | Cook | 324—34 |
| 3,243,692 | 3/1966 | Heissmeier | 323—94 |
| 3,262,053 | 7/1966 | Nasir | 324—37 |
| 3,276,131 | 10/1966 | Hahn | 33—147 |

FOREIGN PATENTS

| | | |
|---|---|---|
| 235,053 | 3/1960 | Australia. |
| 824,653 | 12/1959 | Great Britain. |

RICHARD C. QUEISSER, Primary Examiner

J. WHALEN, Assistant Examiner

U.S. Cl. X.R.

340—18; 324—34; 33—147